United States Patent
Kim (10) Patent No.: US 7,961,180 B2
(45) Date of Patent: Jun. 14, 2011

(54) OPTICAL SENSOR FOR SENSING PERIPHERAL LIGHT AND LIQUID CRYSTAL DISPLAY DEVICE USING THE SAME

(75) Inventor: Jung-Hwan Kim, Ulsan-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1106 days.

(21) Appl. No.: 11/730,525

(22) Filed: Apr. 2, 2007

(65) Prior Publication Data
US 2007/0242030 A1 Oct. 18, 2007

(30) Foreign Application Priority Data

| Apr. 17, 2006 | (KR) | 10-2006-0034694 |
| Apr. 17, 2006 | (KR) | 10-2006-0034695 |
| Apr. 17, 2006 | (KR) | 10-2006-0034696 |

(51) Int. Cl.
G09G 5/00 (2006.01)
(52) U.S. Cl. ...................... 345/207; 345/102; 250/214 R
(58) Field of Classification Search .................. 345/102, 345/207; 250/206–216
See application file for complete search history.

(56) References Cited

U.S. PATENT DOCUMENTS

| 4,959,535 | A | * | 9/1990 | Garrett | ...................... 250/214 R |
| 5,182,446 | A | | 1/1993 | Tew | |
| 7,042,436 | B2 | | 5/2006 | Rossi | |
| 7,110,062 | B1 | | 9/2006 | Whitted et al. | |
| 2005/0082968 | A1 | | 4/2005 | Choi et al. | |
| 2005/0258341 | A1 | | 11/2005 | Nishikawa | |
| 2006/0016964 | A1 | * | 1/2006 | Ogawa | ...................... 250/214 R |
| 2006/0151678 | A1 | | 7/2006 | Shibata | |
| 2006/0192748 | A1 | | 8/2006 | Lowles et al. | |
| 2006/0192749 | A1 | | 8/2006 | Lowles et al. | |

(Continued)

FOREIGN PATENT DOCUMENTS

EP 1 617 192 1/2006

(Continued)

OTHER PUBLICATIONS

Japanese Office action dated Jan. 12, 2010 of the Japanese Patent Application No. 2006-239340, corresponding to the Korean priority application Nos. 10-2006-0034694, 10-2006-0034695, and 10-2006-0034696.
Office action from Japanese Patent Office issued in Applicant's corresponding Japanese Patent Application No. 2006-239340 dated Apr. 21, 2009 and Request for Entry of the Accompanying Office Action.
European Patent Office Search Report issued in Applicant's corresponding European Patent Application No. 07106299.6-2217 dated Oct. 5, 2007.

(Continued)

Primary Examiner — Sumati Lefkowitz
Assistant Examiner — Rodney Amadiz
(74) Attorney, Agent, or Firm — Robert E. Bushnell, Esq.

(57) ABSTRACT

An optical sensor providing enhanced reliability in sensing peripheral light and reduced power consumption, and a liquid crystal display device incorporating this optical sensor. In the optical sensor, a first transistor is electrically coupled between a first power supply and a second transistor, which is electrically coupled between the first transistor and a second power supply having a voltage less than that of the first power supply. The first transistor is either turned-on or turned-off according to a control signal. The second transistor controls an amount of an electric current flowing from the first transistor to the second power supply corresponding to an intensity of peripheral light. A sensing section is constructed with a first capacitor electrically coupled to the second transistor in parallel. A gate electrode of the second transistor is electrically coupled to the second power supply.

21 Claims, 6 Drawing Sheets

U.S. PATENT DOCUMENTS

2006/0197735 A1 9/2006 Vuong et al.
2007/0146296 A1* 6/2007 Kang et al. .................. 345/102

FOREIGN PATENT DOCUMENTS

| EP | 1617192 A1 | 1/2006 |
|---|---|---|
| JP | 08-122149 | 5/1996 |
| JP | 2002-23658 | 1/2002 |
| JP | 2004-348044 | 12/2004 |
| JP | 2006-029332 | 2/2006 |
| JP | 2006-029832 | 2/2006 |
| KR | 10-2005-0046458 | 5/2005 |

OTHER PUBLICATIONS

Chinese Office Action dated on Jun. 12, 2010 of the Chinese Patent Application No. 200710096899.1, which claims priority of the corresponding Korean priority Application No. 10-2006-0034694, 10-2006-0034695 and 10-2006-0034696.

Korean Office action corresponding to Korean Patent Application No. 10-2006-0034695, issued on May 14, 2007.

Korean Office Action corresponding to Korean Patent Application No. 10-2006-0034694, issued on Jun. 12, 2007.

* cited by examiner

OPTICAL SENSOR FOR SENSING PERIPHERAL LIGHT AND LIQUID CRYSTAL DISPLAY DEVICE USING THE SAME

CLAIM OF PRIORITY

This application makes reference to, incorporates the same herein, and claims all benefits accruing under 35 U.S.C. §119 from applications for OPTICAL SENSOR FOR DETECTING PERIPHERAL LIGHT AND LIQUID CRYSTAL DISPLAY DEVICE USING THE SAME earlier filed in the Korean Intellectual Property Office on 17 Apr. 2006 and there duly assigned Serial Nos. 10-2006-0034694, 10-2006-0034695 and 10-2006-0034696.

BACKGROUND OF THE INVENTION

1. Field of the Invention

The present invention relates to an optical sensor for sensing peripheral light and a liquid crystal display device using the same, and more particularly to an optical sensor providing enhanced reliability in sensing peripheral light and reduced power consumption, and a liquid crystal display device incorporating this optical sensor.

2. Discussion of the Related Art

Recently, various flat panel displays capable of reducing weight and volume that are intrinsic disadvantages of cathode ray tubes (CRT) have been developed. Flat panel displays include liquid crystal displays (LCD), field emission displays (FED), plasma display panels (PDP), and organic light emitting displays.

LCDs have advantages such as small-size, light-weight and low-power; they have come into the spotlight as a substitute for a CRT, and may eliminate the intrinsic disadvantages of the CRT. Recently, the LCD has been mounted in portable devices such as a portable phone, a private digital assistant (PDA), a monitor, and a television. The LCD, which is a transmissive display device, displays a desired image by adjusting the amount of light transmitted through a liquid crystal layer according to anisotropic refractive indexes of liquid crystal molecules in the liquid crystal layer.

A contemporary active matrix type LCD is typically constructed with a pixel region, a scan driver, a data driver, a gamma voltage supply section, a timing controller, and a backlight driver.

Inside the pixel region, m×n liquid crystal cells are arranged in a matrix pattern, and m data lines intersect n scan lines. A thin film transistor is formed at the intersections of the data lines and the scan lines. The scan driver supplies a scan signal to the scan lines. The data driver supplies a data signal to the data lines. The gamma voltage supply section supplies a gamma voltage to the data driver. The timing controller supplies control signals to the scan driver and the data driver. The backlight driver drives a backlight, which supplies light to the liquid crystal cells.

In the aforementioned LCD, the backlight always irradiates light of a constant brightness to the pixel region. In case that an ambient environment becomes darker, although it is not necessary for great amount of light, the backlight, however, supplies light of a constant brightness to the pixel region. This increases power consumption of the backlight. In practice, the backlight undesirably consumes more than 80% of the power necessary to drive the LCD. Therefore, in order to reduce the power consumption, it is necessary to reliably sense peripheral light and reduce the amount of light generated by the backlight when the peripheral light is less than the brightness necessary to conform to the ambient peripheral light.

SUMMARY OF THE INVENTION

It is therefore an object of the present invention to provide an improved liquid crystal display device.

It is another object of the present invention to provide an optical sensor providing enhanced reliability in sensing peripheral light and reduced power consumption, and a liquid crystal display device incorporating this optical sensor.

The foregoing objects and/or other aspects of the present invention are achieved by providing an optical sensor for sensing peripheral light constructed with a first transistor electrically coupled between a first power supply and a second transistor, which is couple to a second power supply having a voltage less than that of the first power supply, and a sensing section including a first capacitor electrically coupled to the second transistor in parallel. The first transistor is either turned-on or turned-off according to a control signal. The second transistor controls an amount of an electric current flowing from the first transistor to the second power supply corresponding to an intensity of peripheral light. A gate electrode of the second transistor is electrically coupled to the second power supply.

Preferably, the first capacitor has a capacity of more than 1 pF. More preferably, the first and second transistors are N-type transistors. Most preferably, the first transistor is an N-type transistor and the second transistor is a P-type transistor. The optical sensor may be further constructed with at least one amplifier electrically coupled with an output terminal of the sensing section. The amplifier is constructed with a third transistor electrically coupled between the first power supply and a fourth transistor, which is electrically coupled between the first power supply and the second power supply. The third transistor is either turned-on or turned-off according to a bias signal. A gate electrode is electrically coupled with an output terminal of the sensing section. The third and fourth transistors are P-type transistors. The optical sensor may be further constructed with at least one noise eliminator electrically coupled between the sensing section and the amplifier.

The noise eliminator is constructed with at least one capacitor including a second capacitor, and a plurality of switches including a first switch electrically coupled between an output terminal of the sensing section and a gate electrode of at least one transistor included in the amplifier, a second switch electrically coupled between a reference power supply and one terminal of the second capacitor, a third switch electrically coupled between the opposite terminal of the second capacitor and an output terminal of the amplifier, a fourth switch electrically coupled between the one terminal of the second capacitor, which is electrically coupled with the second switch, and the gate electrode of at least one transistor constituting the amplifier, and a fifth switch electrically coupled between the opposite terminal of the second capacitor, which is electrically coupled with the third switch, and the output terminal of the sensing section. The first, second and third switches are either turned-on or turned-off according to a first switching pulse. The fourth and fifth switches are either turned-on or turned-off according to a second switching pulse, which is different from the first switching pulse that controls the first, second and third switches.

According to a second aspect of the present invention, there is provided a liquid crystal display device constructed with a pixel region including a plurality of liquid crystal cells, at least one optical sensor for sensing peripheral light installed at a black matrix region formed at a peripheral region of the pixel region, and for generating a sensing signal corresponding to an intensity of the peripheral light, a backlight for supplying light to the pixel region, and a backlight driver for controlling a luminance of the light generated by the backlight corresponding to the sensing signal. The optical sensor is constructed with a first transistor electrically coupled between a first power supply and a second transistor, which is electrically coupled between the first transistor and a second power supply having a voltage less than that of the first power supply, and a sensing section including a first capacitor electrically coupled to the second transistor in parallel. The first transistor is either turned-on or turned-off according to a control signal, and the second transistor controls an amount of an electric current flowing from the first transistor to the second power supply corresponding to an intensity of peripheral light. A gate electrode of the second transistor is electrically coupled to the second power supply.

Preferably, the first capacitor has a capacity of more than 1 pF. More preferably, the gate electrode of the second transistor is disposed within an opened portion of the black matrix. Most preferably, the optical sensor is constructed with at least one amplifier, which is electrically coupled to an output terminal of the sensing section. The amplifier is constructed with a third transistor electrically coupled between the first power supply and a fourth transistor, which is electrically coupled between the third transistor and the second power supply. The third transistor is either turned-on or turned-off according to a bias signal, and a gate electrode of the fourth transistor is electrically coupled with an output terminal of the sensing section. The third and fourth transistors are P-type transistors. The optical sensor may be further constructed with at least one noise eliminator electrically coupled between the sensing section and the amplifier. The noise eliminator is constructed with at least one capacitor including a second capacitor, and a plurality of switches. The noise eliminator is constructed with a first switch electrically coupled between an output terminal of the sensing section and a gate electrode of at least one transistor included in the amplifier, a second switch electrically coupled between a reference power supply and one terminal of the second capacitor, a third switch electrically coupled between the opposite terminal of the second capacitor and an output terminal of the amplifier, a fourth switch electrically coupled between the one terminal of the second capacitor, which is electrically coupled with the second switch, and the gate electrode of at least one transistor constituting the amplifier, and a fifth switch electrically coupled between the opposite terminal of the second capacitor, which is electrically coupled with the third switch, and the output terminal of the sensing section. The first to third switches are either turned-on or turned-off according to the same switching pulse. The fourth and fifth switches are either turned-on or turned-off according to the same switching pulse, which is different from the switching pulse which controls the first to third switches.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
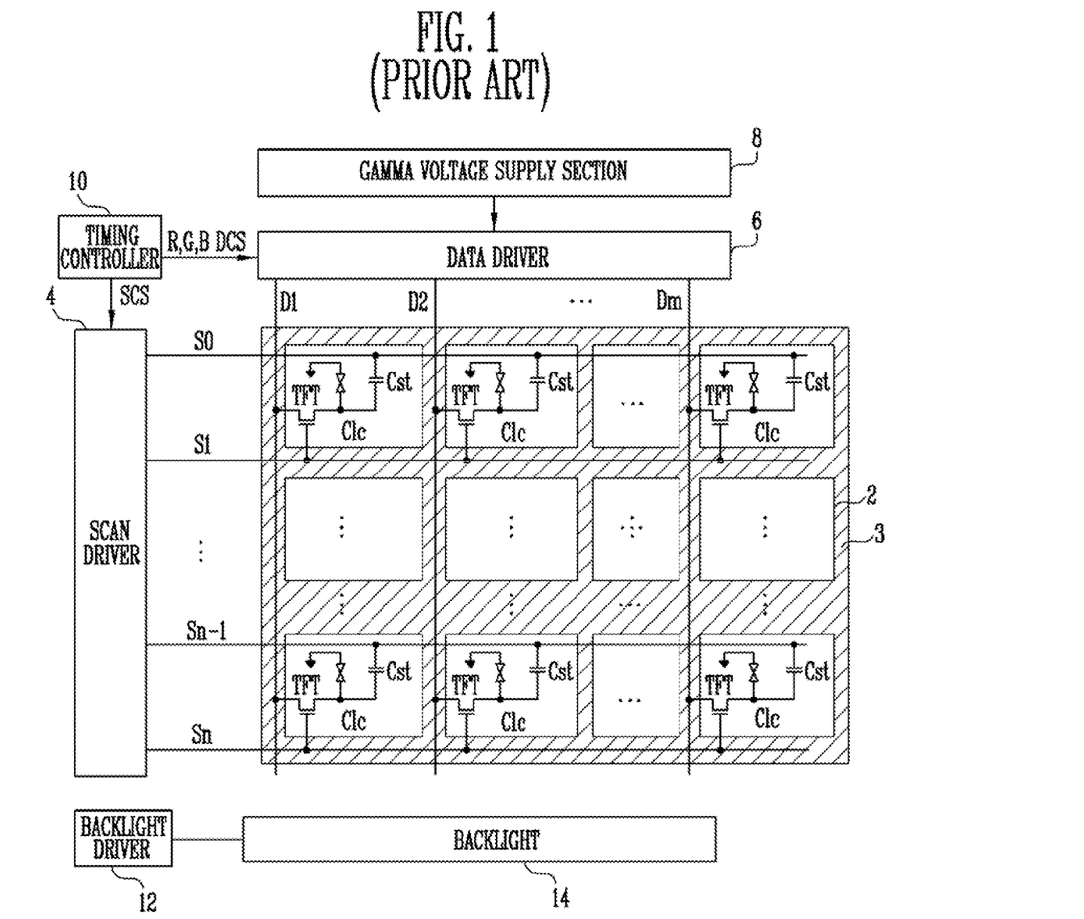
FIG. 1 is a view showing a contemporary LCD.

FIG. 1 is a view showing a contemporary active matrix type LCD. With reference to FIG. 1, the contemporary LCD is typically constructed with a pixel region 2, a scan driver 4, a data driver 6, a gamma voltage supply section 8, a timing controller 10, and a backlight driver 12.

In pixel region 2, m×n liquid crystal cells Clc are arranged in a matrix pattern, and m data lines D1 to Dm intersect n scan lines S1 to Sn. A thin film transistor TFT is formed at each intersection of data lines D1 to Dm and scan lines S1 to Sn. Scan driver 4 supplies a scan signal to scan lines S1 to Sn. Data driver 6 supplies a data signal to data lines D1 to Dm. Gamma voltage supply section 8 supplies a gamma voltage to data driver 6. Timing controller 10 supplies control signals to scan driver 4 and data driver 6. Backlight driver 12 drives a backlight 14, which supplies light to liquid crystal cells Clc.

Pixel region 2 includes a plurality of liquid crystal cells Clc, which are arranged at intersections of data lines D1 to Dm and scan lines S1 to Sn in a matrix pattern. Thin film transistor TFT formed at each liquid crystal cell Clc provides the data signal from data line D, which is supplied by data driver 6, to liquid crystal cell Clc according to scan signal from scan line S. A storage capacitor Cst is formed at each liquid crystal cells Clc. Storage capacitor Cst may be formed either between a pixel electrode (not shown) of liquid crystal cell Clc and a scan line S of a previous stage, or between the pixel electrode of liquid crystal cell Clc and a common electrode line (not shown), and storage capacitor Cst maintains a voltage of liquid crystal cell Clc constant during one frame period. A black matrix 3 is formed between adjacent liquid crystal cells Clc and at a peripheral region of pixel region 2, and absorbs light emitted from adjacent liquid crystal cells Clc and the peripheral portion of pixel region 2 to prevent a contrast of displayed images from being deteriorated.

Scan driver 4 sequentially provides a scan signal to scan lines S1 to Sn according to a scan control signal SCS from timing controller 10, thereby selecting a horizontal arrays of liquid crystal cells in pixel region 2 to which the data signal is supplied.

Data driver 6 converts externally supplied digital video data R, G, and B into an analog gamma voltage, namely, a data signal corresponding to a gradation value according to a data control signal DCS supplied by timing controller 10, and provides the data signal to data lines D1 to Dm.

Gamma voltage supply section 8 supplies a plurality of gamma voltages to data driver 6.

Timing controller 10 generates scan control signal SCS and data control signal DCS for respectively controlling scan driver 4 and data driver 6 in response to vertical and horizontal synchronous signals Vsync, Hsync and a clock signal CLK. Here, scan control signal SCS for controlling scan driver 4 includes a gate start pulse, a gate shift clock, and a gate output enable. Further, data control signal DCS for controlling data driver 6 includes a source start pulse, a source shift clock, a source output enable, and a polarity signal. Moreover, timing controller 10 aligns externally supplied data R, G, and B again and provides it to data driver 6.

Backlight driver 12 provides a drive voltage (or drive current) for driving backlight 14. Then, backlight 14 generates and provides light corresponding to the drive voltage (or drive current) from backlight driver 12 to pixel region 2.

In the aforementioned LCD, backlight 14 always irradiates light of a constant brightness to pixel region 2. In case that an ambient environment becomes darker, although there is no need for much amount of light, backlight 14 supplies light of a constant brightness to pixel region 2. This causes power consumption of backlight 14 to be undesirably increased. In practice, backlight 14 undesirably consumes more than 80% of power necessary to drive the LCD. Therefore, in order to reduce power consumption, it is necessary to reliably sense peripheral light and reduce amount of light generated by backlight 14 when the peripheral light is less than a brightness.

Hereinafter, preferable embodiments according to the present invention will be described with reference to FIG. 2 to FIG. 11. Here, when a first element is connected to a second element, the first element may be not only directly connected to the second element but also indirectly connected to the second element via a third element. Further, irrelative elements are omitted for clarity. Also, like reference numerals refer to like elements throughout.

Figure 2:
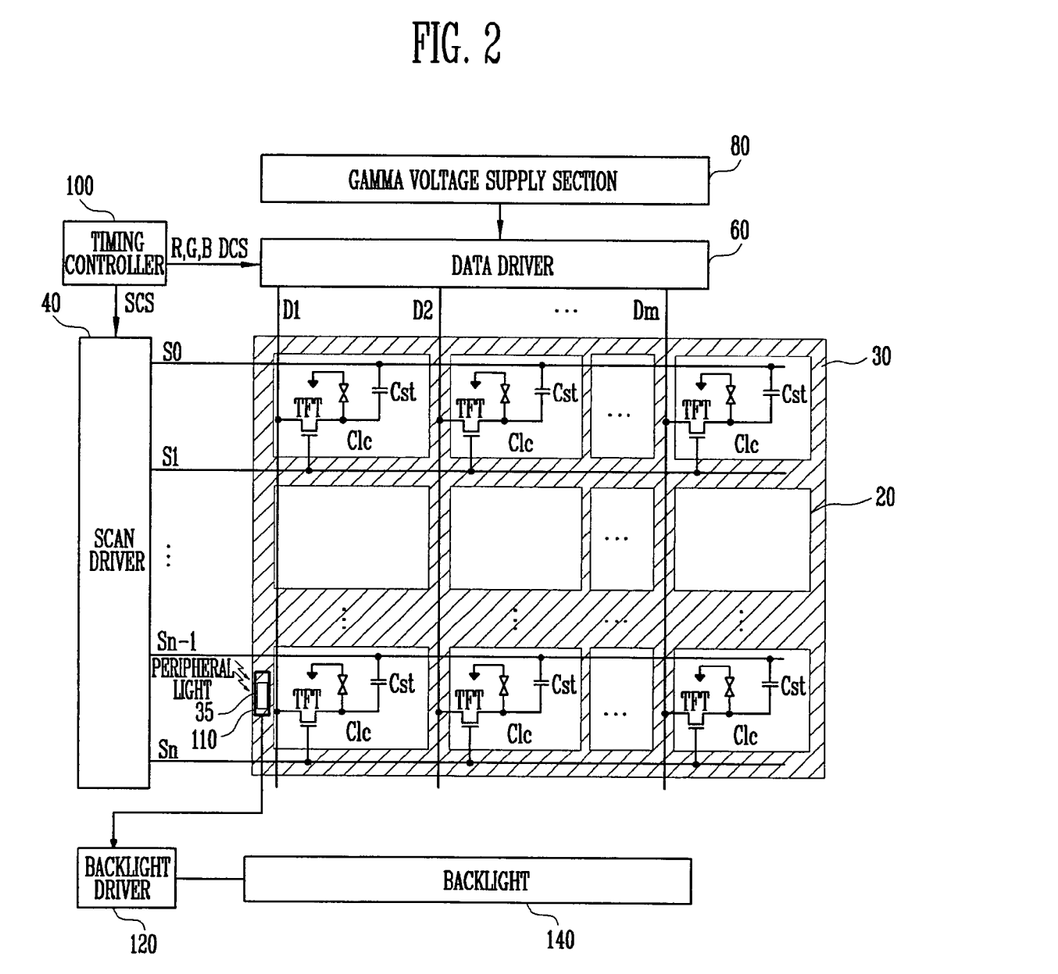
FIG. 2 is a block diagram showing an LCD constructed as an embodiment according to the principles of the present invention.

FIG. 2 is a block diagram showing an LCD constructed as an embodiment according to the principles of the present invention. Although FIG. 2 shows an active matrix type LCD, the present invention is not limited to LCD of this type.

With reference to FIG. 2, the LCD according to an embodiment according to the principles of the present invention is constructed with a pixel region 20, a scan driver 40, a data driver 60, a gamma voltage supply section 80, a timing controller 100, an optical sensor 110 for sensing peripheral light, a backlight driver 120, and a backlight 140. Optical sensor 110 is formed within at least one region of a black matrix 30, which is formed at a peripheral region of pixel region 20. An opened portion 35 is formed at black matrix 30, and peripheral light is emitted to at least one region of optical sensor 110 through opened portion 35. When the peripheral light is emitted to optical sensor 110, optical sensor 110 generates a sensing signal corresponding to an intensity of the peripheral light to control backlight driver 120.

Pixel region 20 is constructed with a plurality of liquid crystal cells Clc, a thin film transistor TFT, and a storage capacitor Cst. Liquid crystal cells Clc are arranged at intersections of data lines D1 to Dm and scan lines S1 to Sn in a matrix pattern. Thin film transistor TFT is formed at each liquid crystal cell Clc and provides a data signal, which is supplied by data driver 60 through data line D to liquid crystal cell Clc, according to a scan signal, which is supplied by scan driver 40 through scan line S. A storage capacitor Cst is formed at each of liquid crystal cells Clc, either between a pixel electrode of liquid crystal cell Clc and a scan line S of a previous stage, or between the pixel electrode of the liquid crystal cell Clc and a common electrode line, and maintains a voltage of liquid crystal cell Clc constant during one frame period. Accordingly, when the scan signal is provided to scan line S, liquid crystal cells Clc change an arranging angle of a liquid crystal corresponding to a supplied data signal and display a desired image with an optical transmission degree varied in dependence upon the changed arranging angle. Here, black matrix 30 is formed between adjacent liquid crystal cells Clc and at a peripheral region of pixel region 20, and absorbs light emitted from adjacent liquid crystal cells Clc and the peripheral region of pixel region 20 to prevent a contrast of displayed images from being deteriorated.

Scan driver 40 sequentially provides a scan signal to scan lines S1 to Sn according to a scan control signal SCS from timing controller 100, thereby selecting a horizontal array of liquid crystal cells in pixel region 20 to which the data signal is supplied.

Data driver 60 converts digital video data R, G, and B into an analog gamma voltage, namely, a data signal, corresponding to a gradation value according to a data control signal DCS from timing controller 100, and provides the data signal to data lines D1 to Dm.

Gamma voltage supply section 80 supplies a plurality of gamma voltages to data driver 60.

Timing controller 100 generates scan control signal SCS and data control signal DCS for respectively controlling scan driver 40 and data driver 60 in response to vertical and horizontal synchronous signals Vsync, Hsync and a clock signal CLK. Here, scan control signal SCS for controlling scan driver 40 includes a gate start pulse, a gate shift clock, and a gate output enable. Further, data control signal DCS for controlling data driver 60 includes a source start pulse, a source shift clock, a source output enable, and a polarity signal. Moreover, timing controller 100 aligns externally supplied data R, G, and B again and provides it to data driver 60.

Optical sensor 110 is formed in at least one region of black matrix 30, which is formed at a peripheral region of pixel region 20. At least one region of optical sensor 110, particularly, a region receiving peripheral light, is positioned at an opened portion 35 of black matrix 30. That is, at least one region of optical sensor 110 is exposed to the peripheral light, so that the peripheral light is incident on optical sensor 110. When optical sensor 110 receives the peripheral light, it generates and provides a sensing signal corresponding to an intensity of the peripheral light to backlight driver 120, thereby controlling backlight driver 120.

Backlight driver 120 provides a drive voltage (or drive current) for driving backlight 140. At this time, backlight driver 120 changes the drive voltage (or drive current) corresponding to the sensing signal from optical sensor 110 to control a luminance of light generated by backlight 140. For example, when backlight driver 120 receives a corresponding sensing signal from optical sensor 110 when an intensity of the peripheral light is weak, it lowers the drive voltage (or drive current) of backlight 140 by a value corresponding to the intensity of the peripheral light to reduce a luminance of the light generated by backlight 140. This reduces power consumption. When backlight driver 120 receives a corresponding sensing signal from optical sensor 110 when the intensity of the peripheral light is equal to or greater than a intensity, it controls the drive voltage (or drive current) of backlight 140 to maintain the luminance of the light generated by backlight 140. This prevents luminous characteristics of pixel region 20 to be deteriorated. On the other hand, although FIG. 2 shows one optical sensor 110, the present invention is not limited to this conformation. For example, a plurality of optical sensors 110 can be installed at black matrix 30 regions. That is, the number of optical sensor 110 can be variously set as at least one.

Backlight 140 generates and provides light corresponding to the drive voltage (or drive current) from backlight driver 120 to pixel region 20.

In the LCD constructed as the embodiment according to the principles of the present invention, optical sensor 110 senses an intensity of peripheral light and controls a luminance of the light generated by backlight 140 based on the sensed result, thereby reducing power consumption. When it is sensed that the intensity of the peripheral light is greater than a value, optical sensor 110 does not reduce the luminance of the light generated by backlight 140, thereby preventing luminous characteristics of pixel region 20 from being deteriorated.

Figure 3:
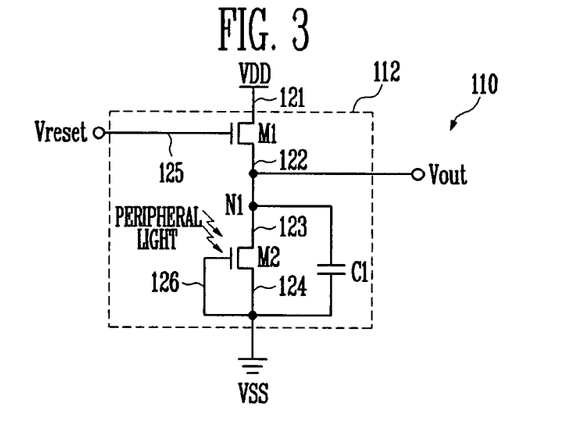
FIG. 3 is a circuitry diagram showing a first example of an optical sensor shown in FIG. 2 for sensing peripheral light.
Figure 4:
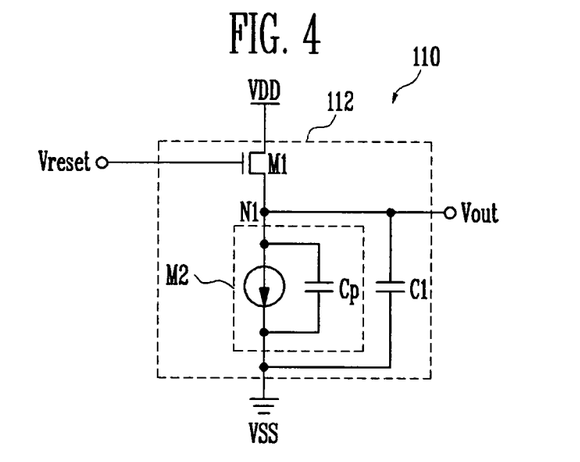
FIG. 4 is a circuitry diagram showing an equivalent circuit of the optical sensor shown in FIG. 3.

FIG. 3 is a circuitry diagram showing a first example of an optical sensor for sensing peripheral light shown in FIG. 2. FIG. 4 is a circuitry diagram showing an equivalent circuit of the optical sensor for sensing peripheral light shown in FIG. 3.

With reference to FIG. 3 and FIG. 4, optical sensor 110 shown in FIG. 2 is constructed with a sensing section 112, which outputs a sensing signal corresponding to an intensity of peripheral light. Sensing section 112 is constructed with first and second transistors M1 and M2 electrically connected to each other in series, and a first capacitor C1 electrically connected to second transistor M2 in parallel.

First transistor M1 is made from an N-type transistor. First electrode 121 of first transistor M1 is electrically coupled with a first power supply VDD, and second electrode 122 of first transistor M1 is electrically coupled with a first node N1. Further, gate electrode 125 of first transistor M1 is electrically coupled with a control terminal and receives a control signal Vreset. Various signals can be used as control signal Vreset. For example, one of the scan signals supplied from scan driver 40 can be provided as control signal Vreset. First transistor M1 is either turned-on or turned-off according to control signal Vreset supplied to the gate electrode of first transistor M1. For example, when a control signal Vreset of a high level is supplied to gate electrode 125 of first transistor M1, first transistor M1 is turned-on to supply first power supply VDD to first node N1. In contrast to this, when a control signal Vreset of a low level is supplied to gate electrode 125 of first transistor M1, first transistor M1 is turned-off and no power is supplied to first node N1.

Second transistor M2 is made from an N-type transistor. First electrode 123 of second transistor M2 is electrically coupled with first node N1, and second electrode 124 of second transistor M2 is electrically coupled with a second power supply VSS having a voltage value less than that of first power supply VDD. Further, gate electrode 126 of second transistor M2 is electrically coupled with second electrode 124 of second transistor M2 and second power supply VSS. That is, when a control signal Vreset of a high level is supplied to gate electrode 125 of first transistor M1 and first transistor M1 is turned-on to supply first power supply VDD to first node N1 (i.e., first electrode 123 of second transistor M2), gate electrode 126 of second transistor M2 is electrically coupled with second electrode 124 receiving a voltage less than that of the first electrode, so that second transistor M2 is diode-connected in a reverse direction. Gate electrode 126 of second transistor M2 is positioned at opened portion 35 of black matrix 30 and receives peripheral light. Second transistor M2 having a construction described above controls an amount of an electric current flowing from first transistor M1 to second power supply VSS corresponding to an intensity of the peripheral light. Namely, when the peripheral light is supplied to second transistor M2, second transistor M2 operates as a current source, which flows an electric current corresponding to the intensity of the peripheral light.

Here, since second transistor M2 is reversely diode-connected, an electric current value corresponding to the intensity of the peripheral light is linearly changed, thereby improving the reliability of the peripheral light sensing performance. Here, a parasitic capacitor Cp is produced in second transistor M2. Parasitic capacitor Cp is connected to the current source (i.e., second transistor M2) in parallel. When a control signal Vreset is supplied to parasitic capacitor Cp, parasitic capacitor Cp is charged with a charge corresponding to a voltage difference between first power supply VDD and second power supply VSS. In order to sufficiently charge parasitic capacitor Cp with the charge corresponding to a voltage difference between first power supply VDD and second power supply VSS, the parasitic capacitor Cp should have a capacitance which is more than 1 pF. In this case, second transistor M2 should have a channel width greater than 100 μm, for example, have a channel width ranging from approximately 1000 μm to approximately 56000 μm. However, when the size of second transistor M2 positioned at an opened portion 35 of black matrix 30 is increased, it can be recognized that a bright spot is undesirably formed at black matrix regions 30. Further, second transistor M2 may be significantly influenced by peripheral circuits, deteriorating operation characteristics of transistor M2.

In order to prevent this phenomenon, the present invention is further constructed with a first capacitor C1, which is electrically coupled with second transistor M2 in parallel. First capacitor C1 should have a capacitance more than 1 pF. When first power supply VDD is supplied to first node N1, first capacitor C1 is charged with a charge corresponding to a voltage difference between first power supply VDD and second power supply VSS. When the present invention is constructed with first capacitor C1 having a construction mentioned above, it is unnecessary for second transistor M2 to have a channel width greater than 1000 μm. Accordingly, the size of second transistor M2 is reduced to prevent opened portion 35 of black matrix 30 being recognized as a bright spot and to reduce an influence of peripheral circuits to second transistor M2. Further, an amplitude variation of the capacitance according to a process fluctuation can be reduced to stabilize an output signal from optical sensor 110. A capacitance of parasitic capacitor Cp in second transistor M2 is less than that of first capacitor C1. When first power supply VDD is supplied to first node N1, however, parasitic capacitor Cp is charged with the same amount of charge being charged to first capacitor C1.

A method for sensing an intensity of the peripheral light by sensing section 112 of optical sensor 110 will be now explained. When a control signal Vreset of a high level is supplied to first transistor M1, first transistor M1 is turned-on to supply first power VDD to first node N1. Accordingly, first capacitor C1 and parasitic capacitor Cp of second transistor M2 are charged with a charge corresponding to a voltage difference between first power supply VDD and second power supply VSS. At this time, control signal Vreset of a high level is supplied only for a time period. When a control signal Vreset of a low level is supplied to first transistor, first transistor is turned-off and no power is supplied to first node. Accordingly, when peripheral light is incident on second transistor M2, particularly to gate electrode 126 of second transistor M2, second transistor M2 drives an electric current to flow from first transistor M1 to second power supply VSS corresponding to an intensity of the peripheral light. Here, because second transistor M2 is reversely diode-connected, an amount of the electric current flowing to second transistor M2 is linearly changed according to the intensity of the peripheral light. Accordingly, first capacitor C1 and parasitic capacitor Cp are discharged. Since the amount of the electric current flowing to second transistor M2 is proportioned to the intensity of the peripheral light, second transistor M2 has different discharge voltage curves according to the amount of discharged charge and the intensity of the peripheral light. An output voltage Vout is outputted to an output terminal electrically coupled with first node N1, namely, a sensing signal varies in proportion to the intensity of the peripheral light.

When backlight driver 120 receives the sensing signal, it controls the luminance of light generated by backlight 140 according to the sensing signal. That is, backlight driver 120 divides the luminance of light into minimal sensing levels corresponding to a variation of output voltage Vout from optical sensor 110, and controls the luminance of the light generated by backlight 140 according to the corresponding levels. Although it is not shown, at least one application circuit can be electrically coupled between the output terminal of sensing section 112 and backlight driver 120.

Here, since first and second transistors M1 and M2, and first capacitor C1 constituting sensing section 112 can be formed when thin film transistor TFT and storage capacitor Cst of pixel region 20 are formed, optical sensor 110 can be embodied without additional processes. When at least one application circuit is electrically coupled with the output terminal of sensing section 112, active type sensing section 112 constructed with first and second transistors M1 and M2 allows an output of the application circuit to be stabilized.

Figure 5:
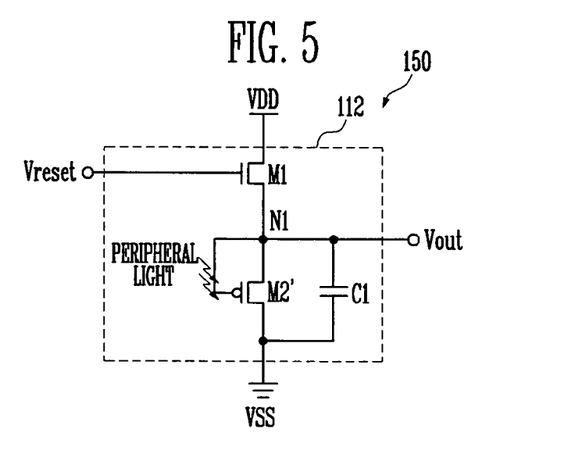
FIG. 5 is a circuitry diagram showing a second example of an optical sensor shown in FIG. 2.

On the other hand, although first and second transistors M1 and M2 are made from N-type transistors in FIG. 3 and FIG. 4, the present invention is not limited thereto. For example, as shown in FIG. 5, second transistor M2' may be made from a P-type transistor. In this case, because an electric current is discretely changed according to a variation of a voltage supplied to a gate electrode of P-type transistor M2', P-type transistor M2' can supply a stable sensing signal to an output terminal of sensing section 112. Here, since optical sensor 150 shown in FIG. 5 is identical to optical sensor 110 shown in FIG. 3 and FIG. 4 except that second transistor M2' of sensing section 112 shown in FIG. 5 is constructed by a P-type transistor, a detailed description of optical sensor 150 shown in FIG. 5 is omitted.

Figure 6:
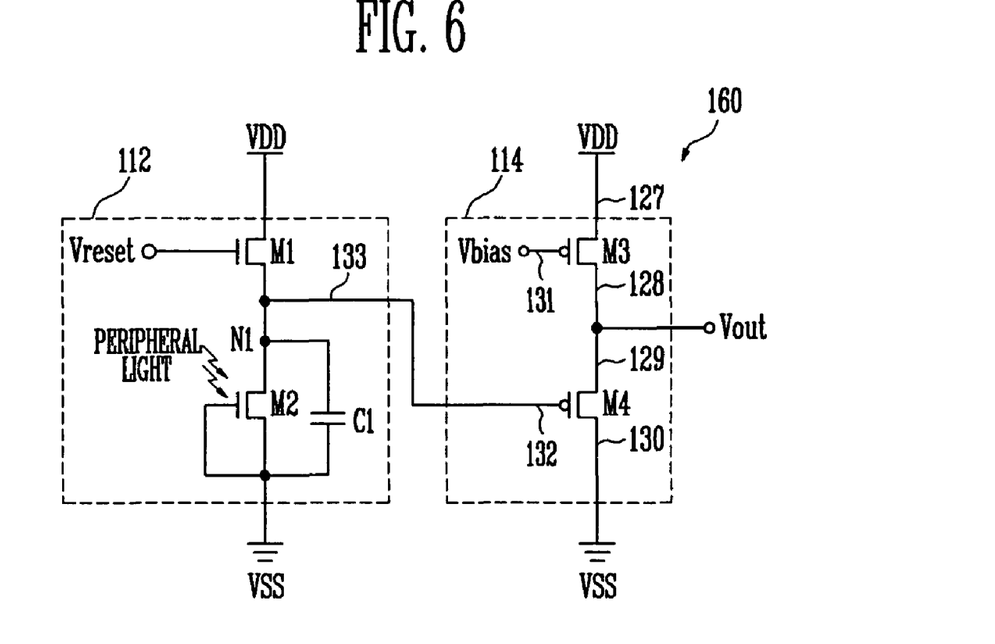
FIG. 6 is a circuitry diagram showing a third example of an optical sensor shown in FIG. 2.

FIG. 6 is a circuitry diagram showing a third example of an optical sensor 110 for sensing peripheral light shown in FIG. 2.

With reference to FIG. 6, optical sensor 160 for sensing peripheral light is constructed with a sensing section 112 and an amplifier 114. Sensing section 112 outputs a sensing signal corresponding to an intensity of peripheral light. Amplifier 114 is electrically coupled with an output terminal 133 of sensing section 112, and amplifies the sensing signal outputted from sensing section 112. Here, because sensing section 112 of the third example has substantially the same construction and function as those of the first example, a detailed description of sensing section 112 is omitted.

Amplifier 114 is constructed with third and fourth transistors M3 and M4, which are electrically coupled with each other in series between first power supply VDD and second power supply VSS. Although it is shown that third and fourth transistors M3 and M4 are P-type transistors, the present invention is not limited thereto. For example, third and fourth transistors M3 and M4 can be N-type transistors.

First electrode 127 of third transistor M3 is electrically coupled with first power supply VDD, and second electrode 128 of third transistor M3 is electrically coupled with first electrode 129 of fourth transistor M4 and an output terminal. Gate electrode 131 of third transistor M3 is electrically coupled with a bias terminal, and receives a bias signal Vbias through the bias terminal. Third transistor M3 operates as a constant current source, which flows an electric current greater than an electric current flowing through sensing section 112 by several hundreds times corresponding to the sufficiently great bias signal Vbias.

First electrode 129 of fourth transistor M4 is electrically coupled with second electrode 128 of third transistor M3 and the output terminal of amplifier 114, and second electrode 130 of fourth transistor M4 is electrically coupled with second power supply VSS. Gate electrode 132 of fourth transistor M4 is electrically coupled with output terminal 133 of sensing section 112, and receives a sensing signal from sensing section 112 corresponding to an intensity of peripheral light. An internal resistance of fourth transistor M4 varies corresponding to the sensing signal.

Hereinafter, an operation of amplifier 114 will be explained.

When sensing section 112 having received peripheral light outputs a sensing signal corresponding to an intensity of the peripheral light to amplifier 114, amplifier 114 operates as a source follower, which leads a voltage variation of the sensing signal to a great current variation to amplify an electric current. In detail, third transistor M3 operates as a constant current source, which flows an electric current greater than the electric current flowing through sensing section 112 by several hundreds times corresponding to an externally supplied bias signal Vbias. Further, fourth transistor M4 receives a sensing signal from sensing section 112. At this time, because the voltage value of the sensing signal is less than that of first power supply VDD, fourth transistor M4 having received the sensing signal is turned-on, and an internal resistance of fourth transistor M4 varies corresponding to the sensing signal. Accordingly, an output signal Vout outputted to an output terminal of amplifier 114 (i.e., an output terminal of optical sensor 110) varies corresponding to the sensing signal. At this time, since third transistor M3 flows an electric current significantly greater than the electric current flowing through sensing section 112, the sensing signal is amplified and outputted as an output signal Vout.

Accordingly, the sensing signal from sensing section 112 is amplified by amplifier 114 and the amplified signal is outputted to an outside of optical sensor 110, thereby improving a driving force of optical sensor 110 which drives application circuits electrically coupled with an output terminal of optical sensor 110.

Backlight driver 120 is electrically coupled with the output terminal of optical sensor 110, and controls a luminance of light generated by backlight 140 based on an amplified sensing signal.

Figure 7:
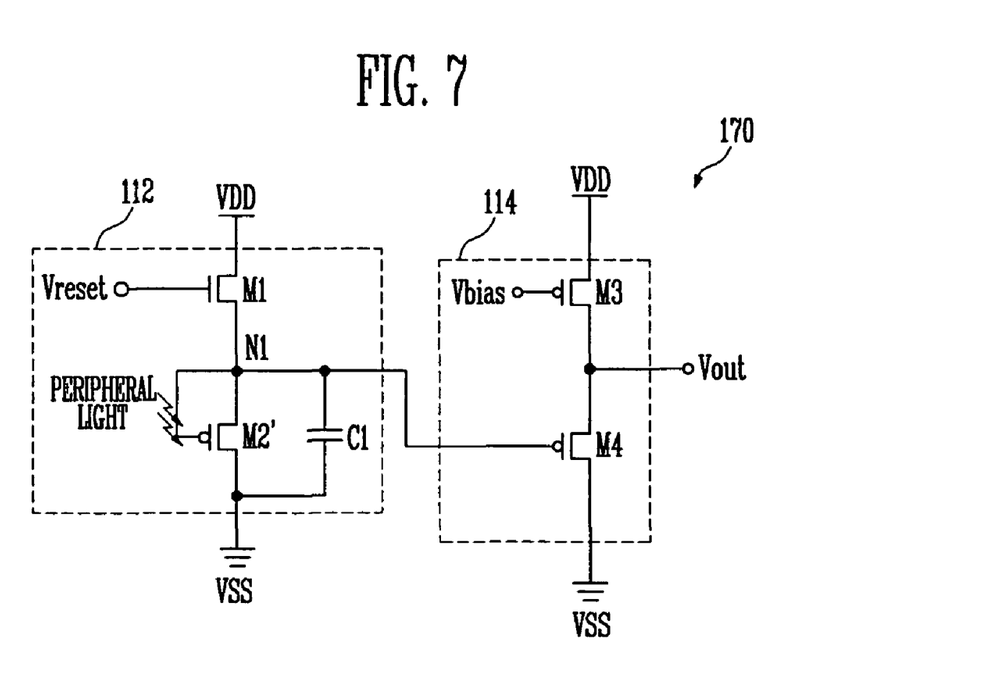
FIG. 7 is a circuitry diagram showing a fourth example of an optical sensor shown in FIG. 2.

On the other hand, first and second transistors M1 and M2 included in the sensing section 112 are shown in FIG. 6 as N-type transistors, the present invention is not limited thereto. For example, as shown in FIG. 7, second transistor M2' can be made from a P-type transistor. In this case, because an electric current amount is discretely changed according to a variation of a voltage, P-type transistor M2' may provide a stable sensing signal to an output terminal of sensing section 112, namely, amplifier 114. Here, optical sensor 170 shown in FIG. 7 is identical with optical sensor 160 shown in FIG. 6 except for a second transistor M2' of sensing section 112 being made from a P-type transistor. Accordingly, a detailed description of optical sensor 110 shown in FIG. 7 is omitted.

Figure 8:
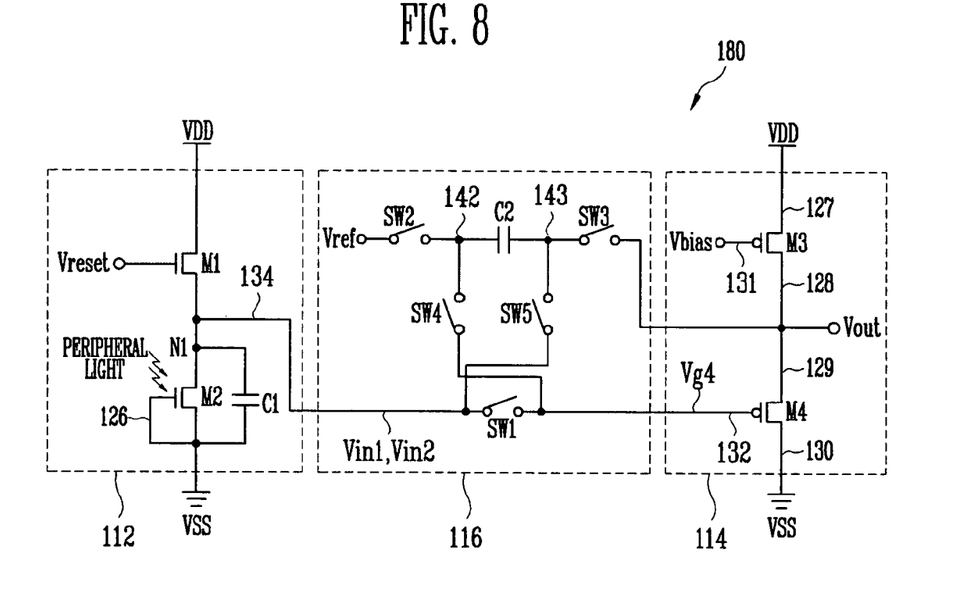
FIG. 8 is a circuitry diagram showing a fifth example of an optical sensor shown in FIG. 2.

FIG. 8 is a circuitry diagram showing a fifth example of an optical sensor 110 for sensing peripheral light shown in FIG. 2.

Referring to FIG. 8, optical sensor 180 is constructed with a sensing section 112, an amplifier 114, and a noise eliminator 116. Sensing section 112 outputs a sensing signal corresponding to an intensity of peripheral light. Amplifier 114 amplifies the sensing signal from sensing section 112. Noise eliminator 116 is electrically coupled between sensing section 112 and amplifier 114, and eliminates a noise to stabilize an output signal Vout, which is outputted from optical sensor 110. Here, since sensing section 112 and amplifier 114 have substantially the same constructions as those of the first or third embodiment, a detailed description of sensing section 112 and amplifier 114 is omitted.

Noise eliminator 116 is constructed with first to fifth switches SW1 to SW5, and a second capacitor C2. Here, although first to fifth switches SW1 to SW5 are shown in a switch sign, they can be embodied by a transmission gate, which receives a switch pulse. First to third switches SW1 to SW3 are either turned-on or turned-off depending upon an external first switching pulse SWP1, and fourth and fifth switches SW4 and SW5 are either turned-on or turned-off depending upon an external second switching pulse SWP2.

First switch SW1 is located between output terminal 134 of sensing section 112 and a gate electrode 132 of fourth transistor M4. When the external first switching pulse SWP1 is supplied to first switch SW1, first switch SW1 is turned-on to electrically couple gate electrode 132 of fourth transistor M4 with output terminal 134 of sensing section 112.

Second switch SW2 is located between a reference power supply and terminal 142 of second capacitor C2. When the external first switching pulse SWP1 is supplied to second switch SW2, second switch SW2 is turned-on to electrically couple second capacitor C2 with the reference power supply.

Third switch SW3 is located between terminal 143 of second capacitor C2 and an output terminal of amplifier 114 (namely, a common node of third and fourth transistors M3 and M4). When the external first switching pulse SWP1 is supplied to third switch SW3, third switch SW3 is turned-on to electrically couple second capacitor C2 with the output terminal of amplifier 114.

Fourth switch SW4 is located between terminal 142 of second capacitor C2, which is electrically coupled with second switch SW2, and gate electrode 132 of fourth transistor M4. When the external second switching pulse SWP2 is supplied to fourth switch SW4, fourth switch SW4 is turned-on to electrically couple second capacitor C2 with gate electrode 132 of fourth transistor M4.

Fifth switch SW5 is located between terminal 143 of second capacitor C2, which is electrically coupled with third switch SW3, and an output terminal of sensing section 112. When the external second switching pulse SWP2 is supplied to fifth switch SW5, fifth switch SW5 is turned-on to electrically couple second capacitor C2 with the output terminal of sensing section 112.

One terminal 142 of second capacitor C2 is electrically coupled with second and fourth switches SW2 and SW4, whereas another terminal 143 of second capacitor C2 is electrically coupled with third and fifth switches SW3 and SW5. Second capacitor C2 is charged with a charge corresponding to a difference between the voltages supplied to both terminals of second capacitor C2.

Operation and effects of the aforementioned optical sensor 180 will be now described with reference to FIG. 9 and FIG. 10.

Figure 9:
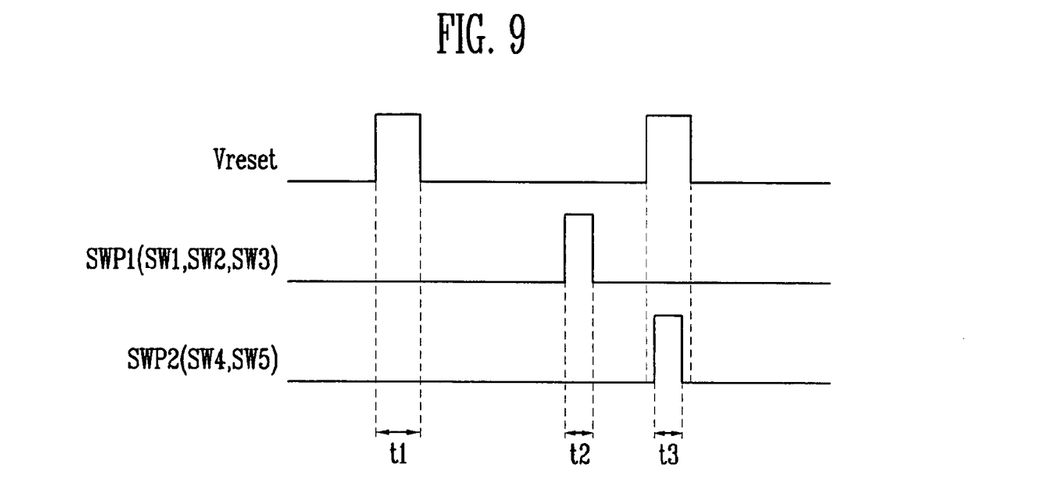
FIG. 9 is a waveform diagram showing a method for driving an optical sensor shown in FIG. 8.
Figure 10:
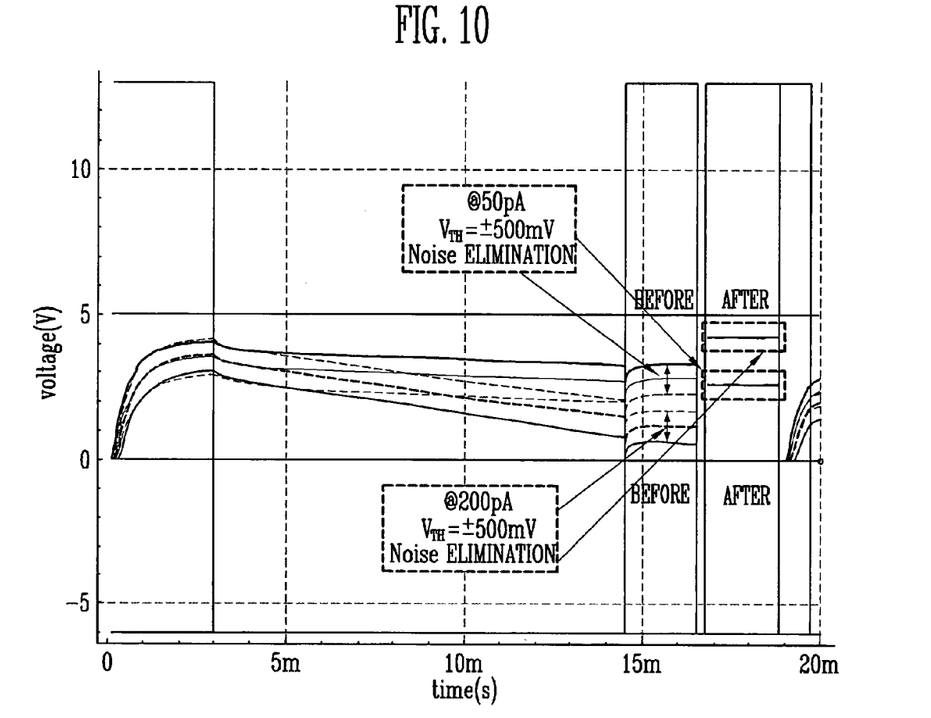
FIG. 10 is a waveform diagram showing an output voltage of an optical sensor shown in FIG. 8 as a function of time elapsed.

FIG. 9 is a waveform diagram showing a method for driving optical sensor 180 for sensing peripheral light shown in FIG. 8. FIG. 10 is a waveform diagram showing an output voltage of optical sensor 180 for sensing the peripheral light shown in FIG. 8 according to a time lapse.

First, during time period t1, a control signal Vreset of a high level is supplied to sensing section 112, and first transistor M1 is turned-on to supply first power supply VDD to first node N1. Then, parasitic capacitance Cp of second capacitor C2 and first capacitor C1 is charged with a charge corresponding to a difference between first power supply VDD and second power supply VSS. Here, control signal Vreset is supplied only for time period t1.

Next, after time period t1, when control signal Vreset of a low level is supplied to sensing section 112 and peripheral light is incident onto second transistor M2, particularly, gate electrode 126 of second transistor M2, an electric current corresponding to an intensity of the peripheral light flows from first transistor M1, through second transistor M2, to second power supply VSS. At this time, because second transistor M2 is reversely diode-connected, the amount of the electric current flowing through second transistor M2 is substantially linearly changed. Accordingly, first capacitor C1 and parasitic capacitor Cp of second transistor M2 are discharged. At this time, since the amount of current flowing through second transistor M2 is proportional to the intensity of the peripheral light, sensing section 112 also has different discharge voltage curves corresponding to the intensity of the peripheral light. Accordingly, a voltage value of the sensing signal supplied to noise eliminator 116 through an output terminal of sensing section 112 varies in proportion to the intensity of the peripheral light.

Thereafter, during a time period t2, when first switching pulse SWP1 is supplied to noise eliminator 116, first to third switches SW1 to SW3 are turned-on. When first switch SW1 is turned-on, a first sensing signal Vin1 from sensing section 112 is supplied to gate electrode 132 of fourth transistor M4. Further, when second switch SW2 is turned-on, a reference voltage Vref is supplied to one terminal 142 of second capacitor C2. When third switch SW3 is turned-on, an output voltage Vout of amplifier 114 is supplied to another terminal 143 of second capacitor C2. Assuming that a capacitance of second capacitor C2 is C, a charge Q1 charged in second capacitor C2 is expressed by the following equation (1) while first switching pulse SWP1 is being supplied:

$$Q1 = C(Vref - Vout) \quad (1)$$

where, Vout is an output voltage determined by voltage Vin1 supplied to gate electrode 132 of fourth transistor M4, a threshold voltage Vth3 of third transistor M3, an electric current Io flowing through third transistor M3, and a process trans conductance parameter Kp with respect to a channel length to a channel width (W/L) of fourth transistor M4, and is expressed by a following equation (2):

$$Vout = Vin1 - Vth3 - \sqrt{\frac{2Io}{Kp}} \quad (2)$$

Accordingly, output voltage Vout of equation (2) is applied to equation (1) to obtain the following equation (3):

$$Q1 = C\left[Vref - \left(Vin1 - Vth3 - \sqrt{\frac{2 Io}{Kp}}\right)\right] \quad (3)$$

Next, during a time period t3, when a second switching pulse SWP2 is supplied to noise eliminator 116, fourth and fifth switches SW4 and SW5 are turned-on. When fourth switch SW4 is turned-on, a gate voltage Vg4 of fourth transistor M4 is supplied to one terminal 142 of second capacitor C2. At this time, gate voltage Vg4 of fourth transistor M4 is set to first sensing signal Vin1. Further, when fifth switch SW5 is turned-on, sensing signal Vin1 from sensing section 112 is supplied to another terminal 143 of second capacitor C2. During time period t3, control signal Vreset is supplied to sensing section 112, and a second sensing signal Vin2 other than first sensing signal Vin1 from sensing section 112 is supplied to terminal 143 of second capacitor C2. Accordingly, while second switching pulse SWP2 is being supplied, a charge Q2 charged in second capacitor C2 is expressed by a following equation (4):

$$Q2=C(Vg4-Vin2)=C(Vin1-Vin2) \quad (4)$$

First sensing signal Vin1 is obtained from equation (2) and is applied to equation (4) to obtain the following equation (5):

$$Q2 = C\left[\left(Vout + Vth3 + \sqrt{\frac{2 Io}{Kp}}\right) - Vin2\right] \quad (5)$$

At this time, since charge Q2 charged in second capacitor C2 while second switching pulse SWP2 is being supplied, is identical to charge Q1 charged in second capacitor C2 while first switching pulse SWP1 is being supplied, charge Q2 of equation (5) is also identical to Q1 of equation (3). An output voltage Vout is obtained by using Q1=Q2 and is expressed by a following equation (6):

$$Vout=Vref-(Vin1-Vin2) \quad (6)$$

With reference to equation (6), output voltage Vout of optical sensor 110 does not include noise due to threshold voltage Vth3 of third transistor M3 and the process trans conductance parameter Kp of fourth transistor M4. That is, output voltage Vout of optical sensor 110 is determined based on reference voltage Vref and first and second sensing signals Vin1 and Vin2, irrespective of process variables in third and fourth transistors M3 and M4, in the event that an output of optical sensor 110 is stabilized. In a case that a value of an optical current due to an intensity of peripheral light is varied between 50 pA and 200 pA, and the variation range of threshold voltage Vth3 of third transistor M3 is –0.5 V to 0.5V, when noise eliminator 116 is turned-off as shown in FIG. 10 (before 16.5 minutes, i.e., from 0 to 16.5 minutes), it is understood that output voltage Vout reflects a variation of threshold voltage Vth3 of third transistor M3 untouched. In addition, for the time period from 14.5 minutes to 16.5 minutes which is corresponding to the time period t2 in FIG. 9, second capacitor C2 is charged with a charged corresponding to the output voltage from sensing section 112. When noise eliminator 116 is turned-on (after 16.8 minutes, that is, after the time period t3 in FIG. 9), however, it would be appreciated that an influence of the variation of threshold voltage Vth3 in third transistor M3 is reduced to generate almost constant output voltage Vout. The time gap between 16.5 minutes to 16.8 minutes is the transient time of the operation of the switches. It's a time period in the interval between the time period t2 and the time period t3 in FIG. 9, not to be overlapped the time period t2 with the time period t3. This results an output of optical sensor 110 corresponding to the intensity of peripheral light to be stabilized. As a result, this leads to enhanced reliability with respect to a peripheral light sensing performance.

In addition, in an operation of optical sensor 110, amplifier 114 is constructed with third transistor M3 and fourth transistor M4, and amplifies an electric current to amplify a sensing signal. Third transistor M3 operates as a constant current source, through which an electric current Io flows. Electric current Io is greater than electric current I1 flowing through sensing section 112 by several hundreds times corresponding to a sufficiently great bias signal Vbias. An internal resistance of fourth transistor M4 changes according to the sensing signal. As described above, amplifier 114 amplifies and outputs the sensing signal from sensing section 112 to an outside of optical sensor 110, thereby enhancing a drive force that optical sensor 110 may employ to drive application circuits electrically coupled to an output terminal of optical sensor 110.

A backlight driver 120 is electrically coupled with an output terminal of optical sensor 110, and receives the amplified sensing signal and controls a luminance of light generated by backlight 140 driven by backlight driver 120.

Figure 11:
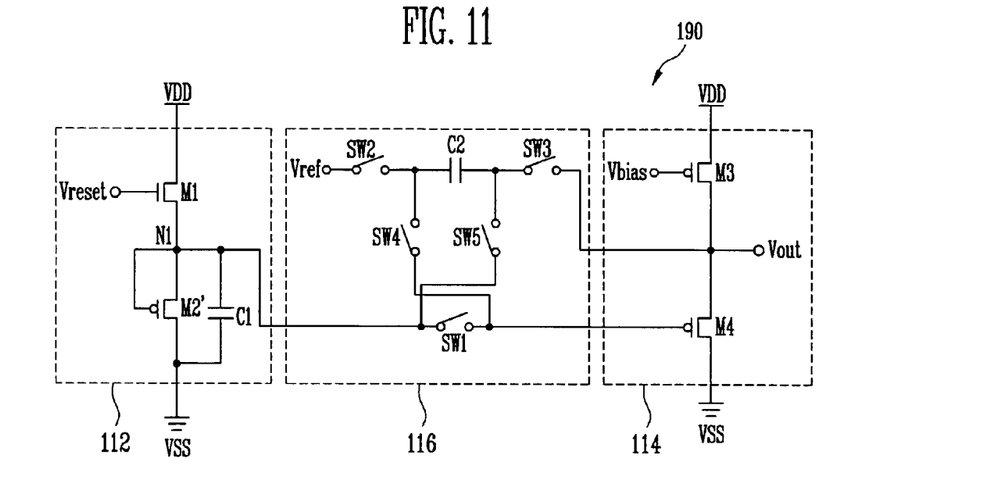
FIG. 11 is a circuitry diagram showing a sixth example of an optical sensor shown in FIG. 2.

On the other hand, although it is shown in FIG. 8 that first and second transistors M1 and M2 are both made from N-type transistors, the present invention is limited thereto. For example, as shown in FIG. 11, second transistor M2' can be made from a P-type transistor. In this case, a current amount is discretely changed according to a variation of a voltage supplied to a gate electrode of P-type transistor M2', and P-type transistor M2' may supply a stable sensing signal to an output terminal of sensing section 112. Here, since optical sensor 110 shown in FIG. 11 is identical with that of FIG. 8 except for second transistor M2' being made from a P-type transistor, a detailed description is omitted.

As mentioned above, the optical sensor for sensing peripheral light and a liquid crystal display device using the same according to the principles of the present invention sense an intensity of the peripheral light to control a luminance of light generated by a backlight, that allows power consumption to be reduced. By using a first capacitor of a sensing section included in the optical sensor, a sufficient amount of charge can be charged without increasing a size of a second transistor. Further, the second transistor is reversely diode-connected and the charged charge is discharged in proportion to the intensity of peripheral light, in the event that reliability can be improved upon sensing the peripheral light. Moreover, by using an amplifier for amplifying a sensing signal from a sensing section, a drive force that the optical sensor used to drive application circuits electrically coupled with an output terminal of the optical sensor, can be enhanced. In addition, a noise eliminator is connected between the sensing section and the amplifier, and may stabilize an output voltage of the optical sensor regardless of process variables of transistors constituting the amplifier.

Although a few embodiments according to the principles of the present invention have been shown and described, it would be appreciated by those skilled in the art that changes might be made in this embodiment without departing from the principles and spirit of the invention, the scope of which is defined in the claims and their equivalents.

What is claimed is:

1. An optical sensor for sensing peripheral light, comprising:
a first transistor electrically coupled between a first power supply and a second power supply having a voltage less than that of the first power supply and being electrically conductive in dependence upon a control signal;
a second transistor electrically coupled between the first transistor and the second power supply, with the second transistor disposed to control an amount of electric current flowing from the first transistor to the second power supply and corresponding to an intensity of peripheral light, and with a gate electrode of the second transistor being electrically coupled to and directly connected with the second power supply;
a sensing section comprising a first capacitor electrically coupled to the second transistor in parallel; and
at least one noise eliminator electrically coupled to the sensing section, the noise eliminator comprising at least one capacitor including a second capacitor, and a plurality of switches.

2. The optical sensor according to claim 1, comprised of the first capacitor having a capacity of more than 1 pF.

3. The optical sensor according to claim 1, comprised of the first and second transistors being N-type transistors.

4. The optical sensor according to claim 1, comprised of the first transistor being an N-type transistor and the second transistor being a P-type transistor.

5. The optical sensor according to claim 1, further comprising at least one amplifier electrically coupled with an output terminal of the sensing section.

6. The optical sensor according to claim 5, comprised of the amplifier comprising:
a third transistor electrically coupled between the first power supply and the second power supply and being turned-on according to a bias signal; and
a fourth transistor electrically coupled between the third transistor and the second power supply, with the third transistor being electrically conductive in dependence upon a bias signal, with fourth transistor comprising a gate electrode electrically coupled with an output terminal of the sensing section.

7. The optical sensor according to claim 6, comprised of the third and fourth transistors being P-type transistors.

8. The optical sensor according to claim 5, wherein the at least one noise eliminator is electrically coupled between the sensing section and the amplifier.

9. The optical sensor according to claim 1, comprised of the noise eliminator comprising:
a first switch electrically coupled between an output terminal of the sensing section and a gate electrode of at least one transistor included in the amplifier;
a second switch electrically coupled between a reference power supply and one terminal of the second capacitor;
a third switch electrically coupled between the other terminal of the second capacitor and an output terminal of the amplifier;
a fourth switch electrically coupled between the one terminal of the second capacitor, which is electrically coupled with the second switch, and the gate electrode of at least one transistor constituting the amplifier; and
a fifth switch electrically coupled between the other terminal of the second capacitor, which is electrically coupled with the third switch, and the output terminal of the sensing section.

10. The optical sensor according to claim 9, comprised of the first to third switches being either turned-on or turned-off according to the same switching pulse.

11. The optical sensor according to claim 9, comprised of the fourth and fifth switches being either turned-on or turned-off according to the same switching pulse.

12. A liquid crystal display device, comprising:
a pixel region comprising a plurality of liquid crystal cells;
at least one optical sensor disposed at a black matrix region formed at a peripheral region of the pixel region for sensing peripheral light and for generating a sensing signal corresponding to an intensity of the peripheral light, with the optical sensor comprising:
a first transistor electrically coupled between a first power supply and a second transistor, the second transistor being electrically coupled between the first transistor and a second power supply having a voltage less than that of the first power supply, with first transistor being electrically conductive in dependence upon a control signal, with the second transistor disposed to control an amount of electric current flowing from the first transistor to the second power supply and corresponding to an intensity of peripheral light, and with a gate electrode of the second transistor being electrically coupled to and directly connected to the second power supply;
a sensing section comprising a first capacitor electrically coupled to the second transistor in parallel; and
at least one noise eliminator electrically coupled to the sensing section, the noise eliminator comprising at least one capacitor including a second capacitor, and a plurality of switches;
a backlight disposed to supply light to the pixel region; and
a backlight driver for controlling a luminance of the light generated by the backlight corresponding to the sensing signal.

13. The liquid crystal display device according to claim 12, comprised of the first capacitor having a capacity of more than 1 pF.

14. The liquid crystal display device according to claim 12, comprised of a gate electrode of the second transistor being disposed at an opened portion of the black matrix.

15. The liquid crystal display device according to claim 12, comprised the optical sensor comprising at least one amplifier, which is electrically coupled to an output terminal of the sensing section.

16. The liquid crystal display device according to claim 15, comprised of the amplifier comprising:
a third transistor electrically coupled between the first power supply and the second power supply and being turned-on according to a bias signal; and
a fourth transistor electrically coupled between the third transistor and the second power supply, with the third transistor being either turned-on or turned-off according to a bias signal, with the fourth transistor comprising a gate electrode electrically coupled with an output terminal of the sensing section.

17. The liquid crystal display device according to claim 16, comprised of the third and fourth transistors being P-type transistors.

18. The liquid crystal display device according to claim 15, wherein the at least one noise eliminator electrically coupled between the sensing section and the amplifier.

19. The liquid crystal display device according to claim 12, comprised of the noise eliminator comprising:

a first switch electrically coupled between an output terminal of the sensing section and a gate electrode of at least one transistor included in the amplifier;

a second switch electrically coupled between a reference power supply and one terminal of the second capacitor;

a third switch electrically coupled between the other terminal of the second capacitor and an output terminal of the amplifier;

a fourth switch electrically coupled between the one terminal of the second capacitor, which is electrically coupled with the second switch, and the gate electrode of at least one transistor constituting the amplifier; and a fifth switch electrically coupled between the other terminal of the second capacitor, which is electrically coupled with the third switch, and the output terminal of the sensing section.

20. The liquid crystal display device according to claim 19, comprised of the first to third switches being either turned-on or turned-off according to the same switching pulse.

21. The liquid crystal display device according to claim 19, comprised of the fourth and fifth switches being either turned-on or turned-off according to the same switching pulse.

* * * * *